Patented May 3, 1927.

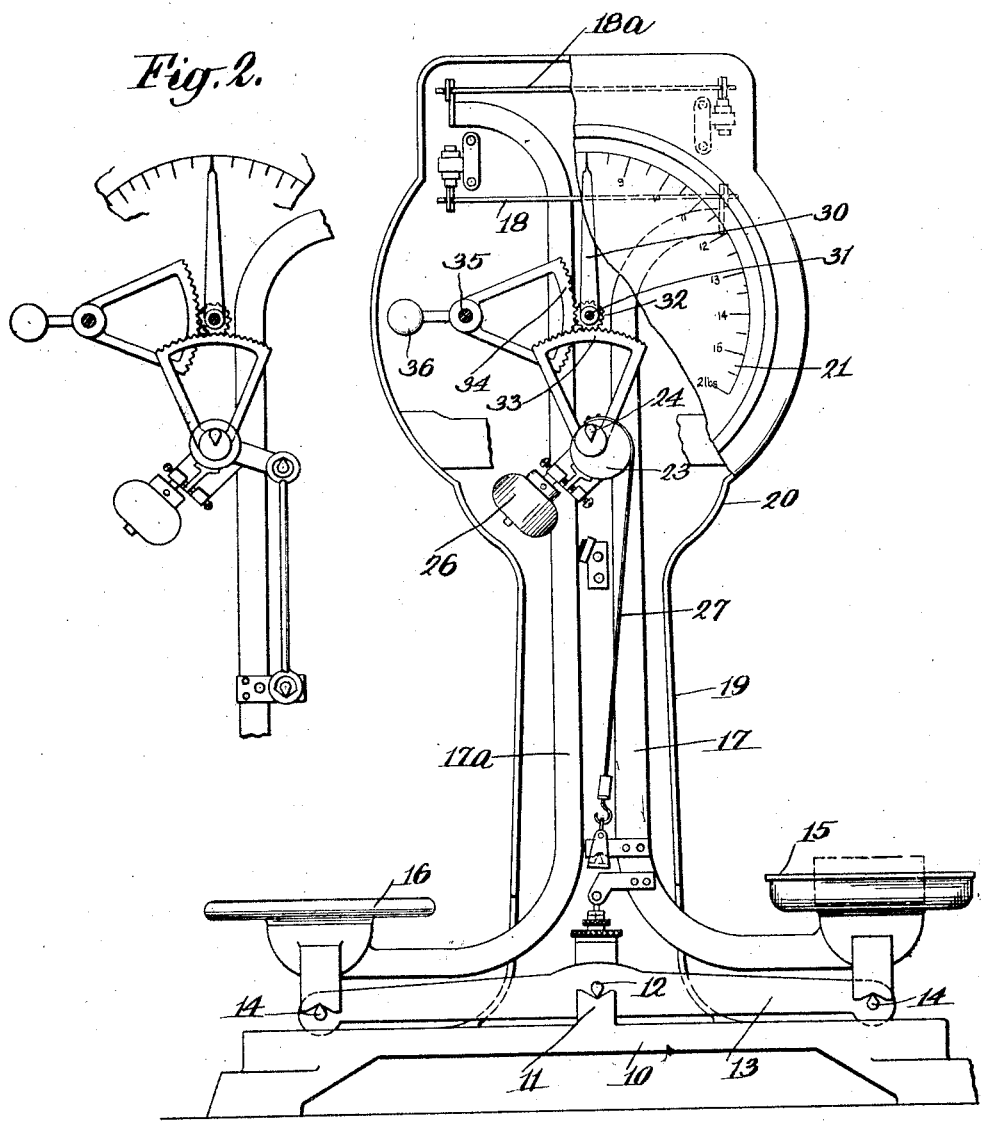

1,626,828

UNITED STATES PATENT OFFICE.

JOSEPH HOPKINSON, OF DAYTON, OHIO, ASSIGNOR TO DAYTON SCALE COMPANY, OF DAYTON, OHIO, A CORPORATION OF NEW JERSEY.

SCALE.

Application filed September 4, 1924. Serial No. 735,732.

This invention relates to certain new and useful improvements in the scale shown and described in my Patent No. 817,777 and in my copending application, Serial No. 734,378, filed August 27, 1924.

The objects of the present invention reside in the provision of a novel form of indicator drive device adapted for cooperation with an even balance scale having a suitable base lever system such as that shown in my Patent No. 817,777.

The objects of the present invention reside in the provision of a novel form of indicator drive which is adapted to give an increased range of indicator movement whereby it is possible to utilize charts having graduations spaced further apart.

The present invention contemplates the provision of a sector shaped rack for driving a pivotal indicator, this sector shaped rack being directly secured to the pendulum counterbalancing system. Also cooperating with the pivotal indicator is a supplementary sector which is adapted to constantly keep the pinion on the pivotal indicator shaft in enmeshment with the driving rack upon one side of the teeth thereof thereby obtaining greater accuracy of operation of the indicator.

In the drawings,

Fig. 1 is a front view of one embodiment of my invention.

Fig. 2 is a detail view of a modification.

In more detail, 10 is the base of the scale having a central bearing 11 adapted to support knife edges 12 carried by the equal arm lever 13. The equal arm lever 13 has adjacent its ends the usual knife edge pivots 14 which support the goods receiver 15 and weight receiver 16. These receivers are respectively supported upon the base lever through intermediate check members 17 and 17ª. These check members extend upwardly in the housing and at their upper ends connect to the check links 18 and 18ª respectively.

In place of using the base lever system herein illustrated I also contemplate the use of any of the other well known forms of even balance base lever systems. For example, I may provide the Beranger balance type of base lever system or, if desired, the lever system may be that employed in the Roverval balance. As an illustration of the Beranger type of lever system reference may be made to my former Patent No. 1,151,593, dated August 31, 1915.

The scale is preferably provided with a suitable pedestal or column 19 which is suitably supported on the base and at its upper end has secured to it a chart housing 20. Within the chart housing are suitable charts, one of which is shown at 21. It will be understood that the usual back chart may also be employed, if desired.

For automatically counterbalancing the applied load a pendulum counterbalance 26 is provided. This counterbalance is suitably mounted upon knife edges 24 and is provided with the usual cam 23 preferably adjustably secured to the pendulum 26. The pendulum load counterbalancing system is connected to the check member 17 through a tape 27. It will be understood that with other forms of base lever systems the tape 27 would connect to any suitable point on the lever system which moves substantially vertical during the loading of the scale.

*Indicator driving devices.*

For indicating the applied load I provide a pivotal indicator 30. This pivotal indicator is properly balanced and carried on an arbor 31 which in turn is suitably mounted in ball bearings carried on a fixed part of the casing. Fast upon the arbor 31 is a pinion 32. For effecting rotation of the pinion 32 a sector shaped rack 33 is provided which is mounted upon the pendulum counterbalancing system so as to rock in unison therewith.

Inasmuch as friction between the pinion 32 and the sector rack 33 must be avoided it is desirable that the rack teeth and pinion teeth loosely mesh. With such loose enmeshment there is a slight amount of play between the cooperating teeth. This play is sufficient to cause a slight amount of error in the indicating position of the pointer 30. To obviate pointer errors due to this play I provide a supplementary sector 34 arranged to mesh with the pinion 33. This sector 34 is secured upon an arbor 35 suitably mounted in the bearings of the casing of the scale. In order to impart a rocking tendency to the sector 34 I provide a weight 36. Weight 36 always tends to rock sector 34 in an anticlockwise direction thus tending to rock pivotal indicator 30 and its attached pinion 32 in a clockwise direction. In this way the lost motion between the pinion 32 and the driving sector 33 is taken care of inasmuch as the teeth of pinion 32 always lightly press against the right side of the teeth of sector 33. This action occurs irrespective of the position of the pivotal indicator.

What I claim is—

1. A weighing scale including in combination with a base lever system of the even balance type, a pendulum load counterbalancing means connected therewith, a pivotal indicator, a pinion therefor, a sector shaped rack operatively connected so as to be movable in unison with said pendulum, counterbalancing means for driving said pinion and a supplementary rack meshing with said pinion and having provisions for causing said pinion to maintain constant enmeshment with one side of the teeth of said aforementioned sector shaped rack.

2. A weighing scale including in combination with a base lever system of the even balance type including a plurality of pans for supporting applied loads and load offsetting weights, pendulum load counterbalancing means including a compensating cam, a tape connecting said cam to a movable part of said base lever system, a pivotal indicator, a pinion therefor, a sector shaped rack connected to and movable in unison with said pendulum counterbalancing means for driving said pinion, and a supplementary rack meshing with the said pinion and having provisions for maintaining the teeth of said pinion in constant enmeshment with one side of the teeth of the sector shaped rack.

In testimony whereof I hereto affix my signature.

JOSEPH HOPKINSON.